United States Patent

[11] 3,609,164

| [72] | Inventors | Munetugu Miyoshi<br>Nishinomiya-shi;<br>Takanobu Oonishi, Osaka-shi, both of Japan |
|---|---|---|
| [21] | Appl. No. | 732,888 |
| [22] | Filed | May 29, 1968 |
| [45] | Patented | Sept. 28, 1971 |
| [73] | Assignee | Tanabe Seiyaku Co., Ltd.<br>Osaka, Japan |
| [32] | Priority | Mar. 27, 1968, Mar. 17, 1968 |
| [33] | | Japan |
| [31] | | 43/19,862 and 43/19,861 |

[54] PROCESS FOR PREPARING -BUTOXYCARBONYL COMPOUNDS
8 Claims, No Drawings

[52] U.S. Cl. ...................................................... 260/309,
260/326.14 T, 45/326.3, 45/471 A, 45/481 R,
260/482 C

[51] Int. Cl. ........................................................ C07c 125/04
[50] Field of Search ............................................ 260/482 C,
561 H, 309, 326.14, 471, 481, 482

[56] References Cited
UNITED STATES PATENTS

| 3,287,398 | 11/1966 | Allais et al. ................... | 260/482 C |
| 3,345,399 | 10/1967 | Gerzon et al. ............. ...... | 260/482 C X |

*Primary Examiner*—Lorraine A. Weinberger
*Assistant Examiner*—Paul J. Killos
*Attorneys*—Harry C. Bierman, Jodan B. Bierman and Bierman & Bierman ABSTRACT: t-butoxycarbonyl compounds as for example t-butoxycarbonylhydrazide or t-butoxycarbonylamino acid, are prepared by reacting hydrazine or an amino acid directly with t-butoxycarbonyl chloride. The reaction is conducted in an aqueous medium, usually at a temperature of −10° to 30°C.

PROCESS FOR PREPARING -BUTOXYCARBONYL COMPOUNDS

The present invention relates to a process for preparing t-butoxycarbonyl compounds. More specifically it relates to a process for preparing t-butoxycarbonylhydrazide and t-butoxycarbonylamino acids.

The t-butoxycarbonyl group is a well-known group used for the protection of the amino group of amino acids, particularly in peptide synthesis. The introduction of the protective t-butoxycarbonyl group has heretofore been accomplished by the use of an expensive reagent such as t-butyl azidoformate (J.Am.Chem.Soc., 82, 2725 (1960)). The prime reason why an inexpensive reagent such as t-butoxycarbonyl chloride has not been used for this purpose is that said reagent is unstable at temperatures above $-60°$ C. It is also unstable in the presence of water (J.Am.Chem.Soc., 70, 2967 (1948)). Attempts have been made to use t-butoxycarbonyl chloride, under various reaction conditions, for the one-step t-butoxycarbonylation of amino acids. The results have been unsatisfactory (J.Am.Chem.Soc., 79, 6180 (1957)).

In the known t-butoxycarbonylation of amino acids, the t-butoxycarbonyl chloride reagent has only been employed as a starting or intermediate compound. It is then reacted with hydrazine to produce t-butoxycarbonylhydrazide (Experientia,21, 418 (1965)). T-butoxycarbonylhydrazide is a key intermediate in the synthesis of t-butyl azido-formate. T-butyl azidoformate is used as a t-butoxycarbonylating agent. Due to the instability of t-butoxycarbonylchloride, it has been reacted with hydrazine at temperatures below $-60°$ C. In addition, anhydrous hydrazine is used rather than the less expensive hydrazine hydrate, to insure that the reaction does not take place in the presence of water. The yield of the resultant t-butoxycarbonylhydrazide is approximately 30 percent.

Applicants have surprisingly found, contrary to what has been disclosed in the art, that t-butoxycarbonyl chloride is relatively stable, even in water. For instance, no material decomposition of t-butoxycarbonyl chloride in ether is found, after being stored at $-20°$ C. for 1 week. Further, the contact of an ether solution of t-butoxycarbonyl chloride with water or 2 N sodium hydroxide solution at $0°$ C. for 1 hour results in decomposition of only about 50 percent of the reagent. Based on the above unexpected finding, an attempt has been made to react hydrazine or an amino acid directly with t-butoxycarbonyl chloride in an aqueous medium. As the result of said reaction, the t-butoxycarbonyl compound, i.e. t-butoxycarbonlhydrazide or t-butoxycarbonylamino acid, has been produced at a markedly improved yield.

Accordingly, a basic object of the present invention is to embody a process for preparing t-butoxycarbonylhydrazide and t-butoxycarbonylamino acids. Another object of this invention is to embody an advantageous process for producing a key intermediate in the synthesis of t-butyl azidoformate which is useful as a t-butoxycarbonylating agent. A further object of the invention is to embody a method for the t-butoxycarbonylation of amino acids by the use of t-butoxycarbonyl chloride in a single step. These and other objects will be apparent to those conversant with the art to which the present invention pertains from the above and subsequent descriptions.

In accordance with this invention, the reaction of hydrazine or an amino acid with t-butoxycarbonyl chloride is carried out in an aqueous medium, usually at a temperature from $-10°$ to $30°$ C.

The reagent, t-butoxycarbonyl chloride, may be produced by a known procedure, such as by reacting t-butyl alcohol with phosgene in an organic solvent, at a temperature from $-60°$ to $0°$ C. Organic solvents which may be employed include, for example, ether, tetrahydrofuran or dioxane. The reaction may be carried out in the presence of a tertiary amine such as, for example, pyridine, $\alpha$-picoline, $\gamma$-picoline, triethylamine or dimethylaniline. Although t-butoxycarbonyl chloride may be directly reacted with hydrazine or an amino acid, it is more advantageous to use the reagent in solution form described above.

When hydrazine is reacted with t-butoxycarbonyl chloride, hydrated hydrazine may be employed, such as hydrazine hydrate. The reaction can proceed at a temperature around $0°$ C. The extremely low temperature which is described in the literature for the known procedure is not required. An organic solvent such as for example, ether or toluene is the preferred reaction medium. The yield of the resultant t-butoxycarbonylhydrazide is ordinarily about 70 percent or more as calculated on the basis of the employed t-butyl alcohol.

When an amino acid is reacted with t-butoxycarbonyl chloride, the amino acid may be employed in the form of its alkali metal salt. Examples of amino acids include alanine, arginine, asparagine, aspartic acid, cysteine, cystine, glutamine, glutamic acid, glycine, histidine, hydroxylysine, hydroxyproline, isoleucine, leucine, lysine, methionine, norleucine, norvaline, ornithine, phenylalanine, proline, serine, theronine, thyronine, tryptophan, tyrosine and valine. The alkali metal salt of the amino acid can be formed by neutralizing the carboxyl group of the amino acid with alkali metal hydroxide, alkali metal alkoxide or the like. In the reaction between the alkali metal salt and the t-butoxycarbonyl chloride the presence of an acid-eliminating agent is preferred. Acid-eliminating agents which may be employed include pyridine, triethylamine, sodium bicarbonate, sodium carbonate, sodium hydroxide, alkali metal alkoxide. The reaction medium may be comprised of water or a mixture of water with an organic solvent such as for example tetrahydrofuran, dioxane or lower alkanol. In order to obtain an approximately quantitative yield of t-butoxycarbonylamino acid calculated on the basis of the amino acid of 50 percent excess of t-butoxycarbonyl chloride to the amino acid is recommended.

It is clear from the above description that the process of this invention enables the production high yields of t-butoxycarbonylhydrazide and t-butoxycarbonylamino acids while using an inexpensive reagent, t-butoxycarbonyl chloride. Said compounds are useful as starting or intermediate compounds in peptide synthesis.

Practical and presently preferred embodiments of the present invention are shown in the following examples.

EXAMPLE 1

185 g. (2.5 mol) of t-butyl alcohol is added to a solution of 3 mol of phosgene in 3.5 l. of ether. The resultant mixture is cooled at $-20°$ to $-40°$ C. This is followed by the dropwise addition while stirring, of a solution of 2.5 mol of pyridine in 1,000 ml. of ether. The resulting mixture is stirred for 2 hours at $-20°$ C. The byproduct, pyridine hydrochloride, is collected by filtration and washed with a small amount of ether. The washing ether is combined with the filtrate and concentrated at $-10°$ C. under reduced pressure to remove excess phosgene and ether. The ethereal solution, prepared in this manner, of t-butoxycarbonyl chloride (900 ml.) is stored in a freezer at $-20°$ C.

250 g. (4 mol) of 80 percent hydrazine hydrate is added to 500 ml. of ether and the resulting mixture is cooled to $-2°$ to $2°$ C. About 350 ml. of the ethereal solution of t-butoxycarbonyl chloride (1.0 mol as calculated from t-butyl alcohol), prepared as described above, is diluted with ether to make 1,000 ml. and then added dropwise for 3 hours while stirring vigorously. The stirring is then continued at $-2°$ to $2°$ C. for 2 hours. The reaction mixture is separated into an ether layer and a water layer. The ether layer is washed three times with 150 ml. of saturated sodium chloride solution. The water layer and the washing water are combined and extracted three times with 100 ml. of ether. The ether extract is washed with 50 ml. of saturated sodium chloride solution and combined with the previously obtained ether layer. The combined ether solution is dried and concentrated under reduced pressure to give 98 g. of crude t-butoxycarbonylhydrazide. Melting point, $38°$ to $40°$ C. Pure t-butoxycarbonyl chloride (92 g.) is obtained when the crude t-butoxycarbonylhydrazide is subjected to distillation under reduced pressure. Needles form upon cooling. Melting point, $39.5°$ to $41.5°$ C. Yield, 70.5 percent.

Anal. calculated for $C_5H_{12}N_2O_2$: N, 21.20 percent. Found: N, 20.95 percent.

EXAMPLE 2

13.1 g. (0.1 mol) of L-leucine is dissolved in 100 ml. of N sodium hydroxide solution kept at 0° C. 30 ml. of tetrahydrofuran is added to the mixture. 36 ml. of an ethereal solution of t-butoxycarbonyl chloride (0.1 mol as calculated from t-butyl alcohol), prepared as described in example 1, and 50 ml. of 2 N sodium hydroxide solution are added dropwise to the resultant mixture. The sodium hydroxide is added so that the reaction proceeds in an alkaline medium. The mixture is stirred and kept at −3° to 3° C. during the addition. The resultant mixture is then stirred for 1 hour at the temperature of −3° to 3° C. and for 2 additional hours at room temperature. The pH of the reaction mixture is adjusted, with 3 percent hydrochloric acid, to pH 3, saturated with sodium chloride and extracted with 100 ml. of ethyl acetate. The water layer is washed twice with 50 ml. of ethyl acetate. The ethyl acetate extract and the ethyl acetate washings are combined and washed successively with 1 percent hydrochloric acid and water said hydrochloric acid and water being saturated with sodium chloride. The resulting ethyl acetate solution is dried and concentrated under reduced pressure. The residue is crystallized from a mixture of ethanol and water to give 15.5 g. of N-t-butoxycarbonyl-L-leucine monohydrate. Melting point, 82° to 84° C. Yield, 62 percent calculated from t-butyl alcohol). $[\alpha]_D^{20}$ −24.1° (C=2, acetic acid).

acetic acid).

Anal. calculated for $C_{11}H_{23}NO_5$: N, 5.62 percent. Found: N, 5.65 percent.

EXAMPLE 4

25 g. (0.281 mol) of β-alanine is dissolved, while stirring, in a mixture of 400 ml. of 1.75 N sodium hydroxide solution and 100 ml. of tetrahydrofuran, said mixture being maintained at 0° C. 150 ml. of an ethereal solution of t-butoxycarbonyl chloride (0.42 mol as calculated from t-butyl alcohol), prepared as described in example 1, is added dropwise to the resulting mixture. The temperature of the ethereal solution is kept at −3° to 3° C. The resultant mixture is then reacted and treated as described in example 2. Recrystallization from petroleum ether yields 48 g. of N-t-butoxycarbonyl-β-alanine. Melting point, 79° to 80° C. Yield, 90 percent (calculated from β-alanine).

Anal. calculated for $C_8H_{15}NO_4$: N, 7.40 percent. Found: N, 7.38 percent.

EXAMPLE 5

An amino acid (0.1 mol) is dissolved in N sodium hydroxide solution (0.1 mol) at 0° C. An ethereal solution of t-butoxycarbonyl chloride (0.1 to 0.16 mol), prepared as described in example 1, and 2 N sodium hydroxide solution (0.1 mol) are added dropwise thereto while stirring. The resulting mixture is treated as described in example 2 to yield the N-t-butoxycarbonylamino acids as shown in the following Table:

| Product | Solvent system (molar ratio) | Yield, percent | M.P. (° C.) | $[\alpha]_D^{20}$ acetic acid, degrees | Analysis for nitrogen (found/calcd.) |
|---|---|---|---|---|---|
| N-BOC-L-proline | Water | 85 | 135-136 | −60.0 | 6.48/6.51 |
| N-BOC-L-proline | Water:THF=5:1 | 91 | 135-136 | −59.8 | 6.52/6.51 |
| N-BOC-glycine | Water:MeOH=5:1 | 86 | 88-89 | | 7.96/8.00 |
| N-BOC-L-alanine | Water:MeOH=5:1 | 89 | 81-83 | −24.8 | 7.50/7.40 |
| N-BOC-L-tryptophan | Water:MeOH=6:1 | 88 | 134-136 | −19.2 | 8.95/9.21 |
| N-BOC-L-cystine | Water:MeOH=5:1 | 81 | 143-145 | −119.8 | 6.27/6.36 |
| N-BOC-L-asparagine | Water:THF=1:2 | 47 | 167-169 | *−7.6 | 12.08/12.04 |

NOTE.—BOC: t-butoxycarbonyl; THF: tetrahydrofuran; MeOH: methanol; *: in dimethylformamide.

Anal. calculated for $C_{11}H_{23}NO_5$: N, 5.62 percent. Found: N, 5.66 percent.

EXAMPLE 3

13.1 g. (0.1 mol) of L-leucine is dissolved, while stirring, in a mixture of 250 ml. of tetrahydrofuran and 50 ml. of 4 N sodium hydroxide solution, said mixture being maintained at 0° C. This is followed by the dropwise addition of 36 ml. of an ethereal solution of t-butoxycarbonyl chloride (0.1 mol as calculated from t-butyl alcohol) which is prepared as described in example 1. The ethereal solution is added at −5° to 0° C. The resultant mixture is stirred for 1 hour at the temperature of −5° to 0° C. and for 2 hours at room temperature. The pH of the reaction mixture is adjusted, with 3 percent hydrochloric acid, to pH 3 and then extracted with 300 ml. of ethyl acetate. The water layer is washed twice with 50 ml. of ethyl acetate. The ethyl acetate extract and the ethyl acetate washings are combined, saturated with sodium chloride, and then washed with 1 percent hydrochloric acid and water. The resulting ethyl acetate solution is dried and concentrated under reduced pressure. The residue is crystallized from a mixture of ethanol and water to give 17 g. of N-t-butoxycarbonyl-L-leucine monohydrate. Melting point, 84° to 86° C. Yield, 68 percent (calculated from t-butyl alcohol). $[\alpha]_D^{20}$ −24.1° (C=2, acetic acid).

What is claimed is:

1. A process for preparing t-butoxycarbonyl compounds which comprises the steps of reacting hydrazine, or an amino acid or an alkali metal salt of an amino acid with t-butoxycarbonyl chloride in an aqueous medium at a temperature of −10° to 30° C.

2. A process according to claim 1 wherein said t-butoxycarbonyl chloride is reacted with hydrazine.

3. A process according to claim 2, wherein the hydrazine is hydrated.

4. A process according to claim 1, wherein said t-butoxycarbonyl chloride is reacted with an amino acid.

5. A process according to claim 4, wherein the amino acid is present as its alkali metal salt.

6. A process according to claim 4, wherein the reaction is carried out in the presence of an acid eliminating agent.

7. A process according to claim 6, wherein said acid-eliminating agent is pyridine, triethylamine, sodium bicarbonate, sodium carbonate, sodium hydroxide or alkali metal alkoxide.

8. A process according to claim 4, wherein said amino acid is alanine, arginine, asparagine, aspartic acid, cysteine, cystine, glutamine, glutamic acid, glycine, histidine, hydroxylysine, hydroxyproline, isoleucine, leucine, lysine, methionine, norleucine, norvaline, orinthine, phenylalanine, proline, serine, threonine, thyronine, tryptophan, tyrosine or valine.